United States Patent
Ahn et al.

(10) Patent No.: US 11,470,127 B2
(45) Date of Patent: Oct. 11, 2022

(54) METHOD, SYSTEM, AND NON-TRANSITORY COMPUTER-READABLE RECORD MEDIUM FOR DISPLAYING REACTION DURING VOIP-BASED CALL

(71) Applicant: LINE Plus Corporation, Seongnam-si (KR)

(72) Inventors: DeokYong Ahn, Seongnam-si (KR); Hwan Kim, Hanam-si (KR); Min Jeong Kim, Seongnam-si (KR); Jaehyun Lee, Seongnam-si (KR); Seongsu Kim, Seongnam-si (KR); Kyoung Min Kim, Seongnam-si (KR); Sanghyuk Suh, Seongnam-si (KR); Jeongrok Kim, Seongnam-si (KR); Tae Jeong Lee, Seongnam-si (KR); Jeong Hyeon Kwon, Seongnam-si (KR); Keumryong Kim, Seongnam-si (KR); Na Young Kim, Seongnam-si (KR); Inah Kim, Seongnam-si (KR); Jungjun Park, Seongnam-si (KR)

(73) Assignee: LINE PLUS CORPORATION, Gyeonggi-Do (KR)

(*) Notice: Subject to any disclaimer, the term of this patent is extended or adjusted under 35 U.S.C. 154(b) by 0 days.

(21) Appl. No.: 17/307,518

(22) Filed: May 4, 2021

(65) Prior Publication Data
US 2021/0352118 A1 Nov. 11, 2021

(30) Foreign Application Priority Data
May 6, 2020 (KR) .................. 10-2020-0053605

(51) Int. Cl.
*H04L 65/1096* (2022.01)
*H04L 65/1089* (2022.01)
(Continued)

(52) U.S. Cl.
CPC ...... *H04L 65/1096* (2013.01); *H04L 65/1059* (2013.01); *H04L 65/1089* (2013.01);
(Continued)

(58) Field of Classification Search
CPC ....... H04L 12/1813–1831; H04L 51/10; H04L 51/16; H04L 51/32; H04L 65/00–80;
(Continued)

(56) References Cited

U.S. PATENT DOCUMENTS 8,903,958 B1 * 12/2014 Chavez ................ G06T 15/005
                                                             709/219
9,553,974 B2 *  1/2017 Naik .................. H04M 1/72403
(Continued)

FOREIGN PATENT DOCUMENTS

KR          100401262 B1     10/2003
WO     WO-2019191708 A1 *   10/2019 ......... H04N 21/8133

OTHER PUBLICATIONS

Shamma, David A., et al. "Enhancing online personal connections through the synchronized sharing of online video." CHI'08 extended abstracts on Human factors in computing systems. 2008. 2931-2936. (Year: 2008).*

*Primary Examiner* — Glenton B Burgess
*Assistant Examiner* — Julian Chang
(74) *Attorney, Agent, or Firm* — Harness, Dickey & Pierce, P.L.C.

(57) ABSTRACT

Disclosed is a reaction display method performed by a computer apparatus including processing circuitry, the reaction display method including displaying, by the processing circuitry, a content sharing screen with a voice over Internet protocol (VoIP) call screen during a VoIP call, the content sharing screen including shared media content, and a user of the computer apparatus participating in the VoIP call, receiving, by the processing circuitry, a position at which a
(Continued)

reaction is input from the user during the VoIP call, sending reaction information and the position to at least one other user participating in the VoIP call, the reaction information corresponding to the reaction, and displaying an indication of the reaction on the VoIP call screen or the content sharing screen based on the position.

22 Claims, 12 Drawing Sheets

(51) Int. Cl.
*H04L 65/403* (2022.01)
*H04L 65/1059* (2022.01)
*H04L 65/75* (2022.01)
*H04N 21/4788* (2011.01)

(52) U.S. Cl.
CPC .......... *H04L 65/403* (2013.01); *H04L 65/762* (2022.05); *H04N 21/4788* (2013.01)

(58) Field of Classification Search
CPC ......... H04N 7/14–157; H04N 21/4788; G06Q 50/01
See application file for complete search history.

(56) References Cited

U.S. PATENT DOCUMENTS

| | | | | |
|---|---|---|---|---|
| 9,807,732 B1* | 10/2017 | Clark | | H04W 24/08 |
| 10,348,658 B2* | 7/2019 | Rodriguez | | H04L 65/1069 |
| 10,404,636 B2* | 9/2019 | Rodriguez | | H04L 51/046 |
| 10,536,542 B1* | 1/2020 | Dorner | | H04L 51/10 |
| 10,820,060 B1* | 10/2020 | Bosworth | | H04N 21/478 |
| 10,855,952 B1* | 12/2020 | Rocklin | | G06F 3/017 |
| 11,251,982 B2* | 2/2022 | Gorny | | G06F 16/31 |
| 2009/0232129 A1* | 9/2009 | Wong | | H04N 21/2743 370/352 |
| 2009/0307361 A1* | 12/2009 | Issa | | H04L 63/105 709/229 |
| 2009/0312065 A1* | 12/2009 | Wang | | G06F 3/1454 455/566 |
| 2010/0064307 A1* | 3/2010 | Malhotra | | H04L 65/1086 725/86 |
| 2010/0153497 A1* | 6/2010 | Sylvain | | H04L 12/1827 709/204 |
| 2011/0093784 A1* | 4/2011 | Kiraz | | G06F 16/951 715/719 |
| 2012/0069028 A1* | 3/2012 | Bouguerra | | H04L 51/046 345/473 |
| 2013/0170818 A1* | 7/2013 | Klappert | | H04N 21/4788 386/299 |
| 2013/0173742 A1* | 7/2013 | Thomas | | H04L 65/602 709/217 |
| 2014/0108568 A1* | 4/2014 | Lee | | H04L 65/4015 709/227 |
| 2014/0111598 A1* | 4/2014 | Paxinos | | H04N 21/4788 348/14.04 |
| 2014/0123014 A1* | 5/2014 | Keen | | H04L 51/046 715/719 |
| 2014/0137144 A1* | 5/2014 | Jarvenpaa | | H04N 21/6582 725/13 |
| 2014/0240444 A1* | 8/2014 | Szymczyk | | H04N 7/157 348/14.07 |
| 2014/0333713 A1* | 11/2014 | Shoemake | | H04N 21/44008 348/14.05 |
| 2015/0208217 A1* | 7/2015 | Hong | | H04W 4/16 455/414.1 |
| 2015/0331550 A1* | 11/2015 | Wang | | G06F 3/04842 715/771 |
| 2015/0350258 A1* | 12/2015 | Griffin | | H04N 7/15 348/14.08 |
| 2016/0072861 A1* | 3/2016 | Woolsey | | G06F 3/0484 455/414.1 |
| 2016/0094504 A1* | 3/2016 | Cinar | | G06F 3/04847 715/752 |
| 2016/0231888 A1* | 8/2016 | Govindraj | | G06F 3/04847 |
| 2017/0006356 A1* | 1/2017 | Krasadakis | | G10L 15/22 |
| 2017/0034237 A1* | 2/2017 | Silver | | H04N 5/272 |
| 2017/0168692 A1* | 6/2017 | Chandra | | H04L 51/04 |
| 2017/0171275 A1* | 6/2017 | Bloch | | H04N 21/47205 |
| 2017/0251262 A1* | 8/2017 | Bist | | H04N 21/4756 |
| 2017/0257410 A1* | 9/2017 | Gattis | | H04N 21/8455 |
| 2018/0018319 A1* | 1/2018 | He | | G06F 3/167 |
| 2018/0131731 A1* | 5/2018 | Jones | | H04L 65/1059 |
| 2018/0144775 A1* | 5/2018 | Taine | | G11B 27/102 |
| 2018/0160055 A1* | 6/2018 | Taine | | G06K 9/00711 |
| 2018/0167578 A1* | 6/2018 | Paxinos | | H04N 7/147 |
| 2018/0188905 A1* | 7/2018 | Tran | | G06F 3/0482 |
| 2018/0249200 A1* | 8/2018 | Wang | | H04N 21/41407 |
| 2018/0300037 A1* | 10/2018 | Takeda | | H04N 21/4788 |
| 2018/0352303 A1* | 12/2018 | Siddique | | H04M 3/567 |
| 2018/0365527 A1* | 12/2018 | Li | | G06F 3/0485 |
| 2018/0367483 A1* | 12/2018 | Rodriguez | | H04L 51/04 |
| 2018/0367484 A1* | 12/2018 | Rodriguez | | H04L 67/36 |
| 2019/0019533 A1* | 1/2019 | Kaufman | | H04N 21/47205 |
| 2019/0132275 A1* | 5/2019 | Kelly | | H04L 65/4076 |
| 2019/0294259 A1* | 9/2019 | Liu | | G06F 40/30 |
| 2019/0297384 A1* | 9/2019 | Bist | | G06Q 50/01 |
| 2019/0342240 A1* | 11/2019 | Garrido | | G06V 40/166 |
| 2020/0004394 A1* | 1/2020 | Li | | G06F 3/04817 |
| 2020/0005513 A1* | 1/2020 | Li | | G06F 3/04845 |
| 2020/0045095 A1* | 2/2020 | Paxinos | | H04L 65/605 |
| 2020/0184217 A1* | 6/2020 | Faulkner | | G06T 7/50 |
| 2020/0252553 A1* | 8/2020 | Luo | | G06K 9/00268 |
| 2020/0288206 A1* | 9/2020 | Bist | | G06Q 30/02 |
| 2021/0037195 A1* | 2/2021 | Cutler | | H04L 51/32 |
| 2021/0067476 A1* | 3/2021 | Baker | | G06Q 10/107 |
| 2021/0076099 A1* | 3/2021 | Ganschow | | G06F 21/44 |
| 2021/0192800 A1* | 6/2021 | Dutta | | G06F 40/284 |
| 2021/0258643 A1* | 8/2021 | Park | | H04N 21/44222 |
| 2021/0336912 A1* | 10/2021 | Ahn | | H04N 7/15 |
| 2021/0336998 A1* | 10/2021 | Ahn | | H04L 65/403 |
| 2022/0165059 A1* | 5/2022 | Faulkner | | G06V 20/20 |

\* cited by examiner

FIG. 11
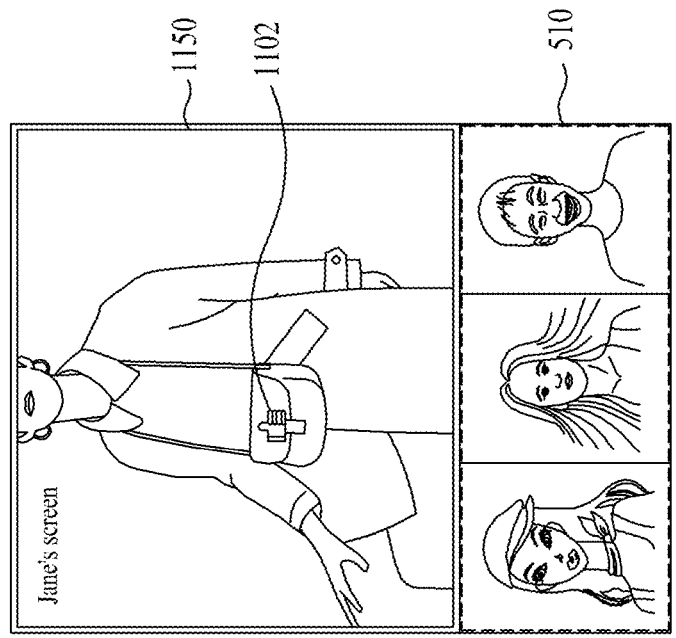
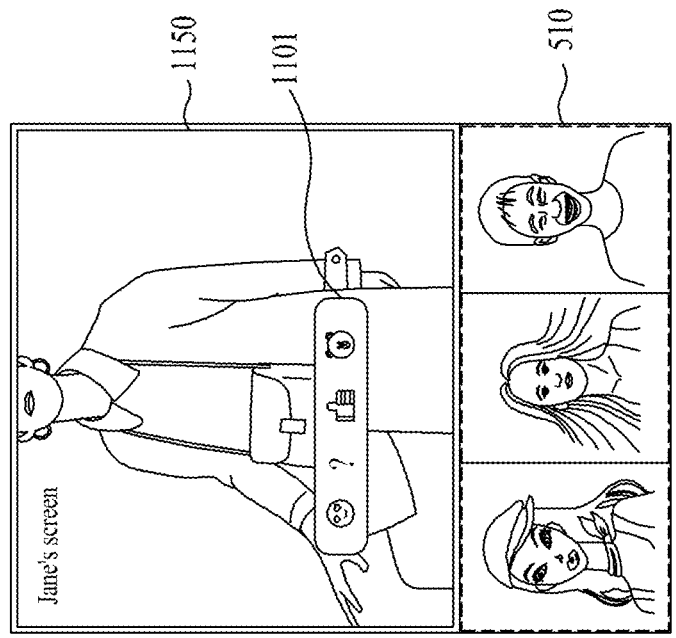

METHOD, SYSTEM, AND NON-TRANSITORY COMPUTER-READABLE RECORD MEDIUM FOR DISPLAYING REACTION DURING VOIP-BASED CALL

CROSS-REFERENCE TO RELATED APPLICATION(S)

This U.S. non-provisional application claims the benefit of priority under 35 U.S.C. § 119 to Korean Patent Application No. 10-2020-0053605, filed May 6, 2020, the entire contents of which are incorporated herein by reference in their entirety.

TECHNICAL FIELD

At least one example embodiment relate to technology for providing a call function based on an Internet phone, for example, a voice over Internet protocol (VoIP).

BACKGROUND

Currently, a communication device provides various services, such as, for example, a wireless Internet service, and a terrestrial/satellite broadcasting service, in addition to a voice call service or a text service.

In particular, with developments in video compression technology and reconstruction technology, and commercialization of a device with a camera, a video call service that enables a call while verifying a face of a counterpart is being provided.

As an example of technology for providing a video call service, a video call service is provided between mobile phone terminals in a mobile phone network of a wireless environment.

SUMMARY

At least one example embodiment may share a variety of media contents between call participants during a voice over Internet protocol (VoIP) call using a social graph.

At least one example embodiment may display a reaction exchanged between call participants during a VoIP call in real time.

According to an aspect of at least one example embodiment, there is provided a reaction display method performed by a computer apparatus including processing circuitry, the reaction display method including displaying, by the processing circuitry, a content sharing screen with a voice over Internet protocol (VoIP) call screen during a VoIP call, the content sharing screen including shared media content, and a user of the computer apparatus participating in the VoIP call, receiving, by the processing circuitry, a position at which a reaction is input from the user during the VoIP call, sending reaction information and the position to at least one other user participating in the VoIP call, the reaction information corresponding to the reaction, and displaying an indication of the reaction on the VoIP call screen or the content sharing screen based on the position.

The receiving may include recognizing coordinates on the VoIP call screen or the content sharing screen at which the reaction is input as the position.

The receiving may include recognizing a playback position of content being played back on the content sharing screen at a point in time at which the reaction is input as the position.

The reaction display method may further include specifying, by the processing circuitry, a reaction target among a participant video in the VoIP call screen and the content sharing screen based on the position.

The specifying may include specifying a screen corresponding to coordinates of the position among the VoIP call screen and the content sharing screen as the reaction target.

The specifying may include specifying the content sharing screen as the reaction target in response to a playback position of content being played back on the content sharing screen being received as the position.

The sending may include specifying a particular user corresponding to the reaction target among a plurality of other users participating in the VoIP call, and sending the reaction information and the position to the particular user.

The sending may include generating metadata of a VoIP call packet including the reaction information and the position, and sending the metadata to the at least one other user. The sending may cause the indication of the reaction to be displayed on a screen of a computer apparatus of the at least one other user based on the metadata.

The displaying may include displaying an object matched to the reaction at a location on one of the VoIP call screen or the content sharing screen based on the position.

The reaction display method may further include sending, by the processing circuitry, information about the shared media content and the reaction information to a chatroom related to the VoIP call.

The reaction display method may further include managing, by the processing circuitry, the information about the shared media content and the reaction information in a format corresponding to a message type used in the chatroom.

According to an aspect of at least one example embodiment, there is provided a non-transitory computer-readable record medium storing instructions that, when executed by at least one processor, cause the at least one processor to implement the reaction display method.

According to an aspect of at least one example embodiment, there is provided a computer apparatus including processing circuitry is configured to display a content sharing screen with a voice over Internet protocol (VoIP) call screen during a VoIP call, the content sharing screen including shared media content, and a user of the computer apparatus participating in the VoIP call, receive a position at which a reaction is input from the user during the VoIP call, send reaction information and the position to at least one other user participating in the VoIP call, the reaction information corresponding to the reaction, and display an indication of the reaction on the VoIP call screen or the content sharing screen based on the position.

Further areas of applicability will become apparent from the description provided herein. The description and specific examples in this summary are intended for purposes of illustration only and are not intended to limit the scope of the present disclosure.

BRIEF DESCRIPTION OF DRAWINGS

FIGS. 10 to 12 illustrate examples of a process of displaying a reaction during a VoIP call according to at least one example embodiment.

DETAILED DESCRIPTION

Figure 1:
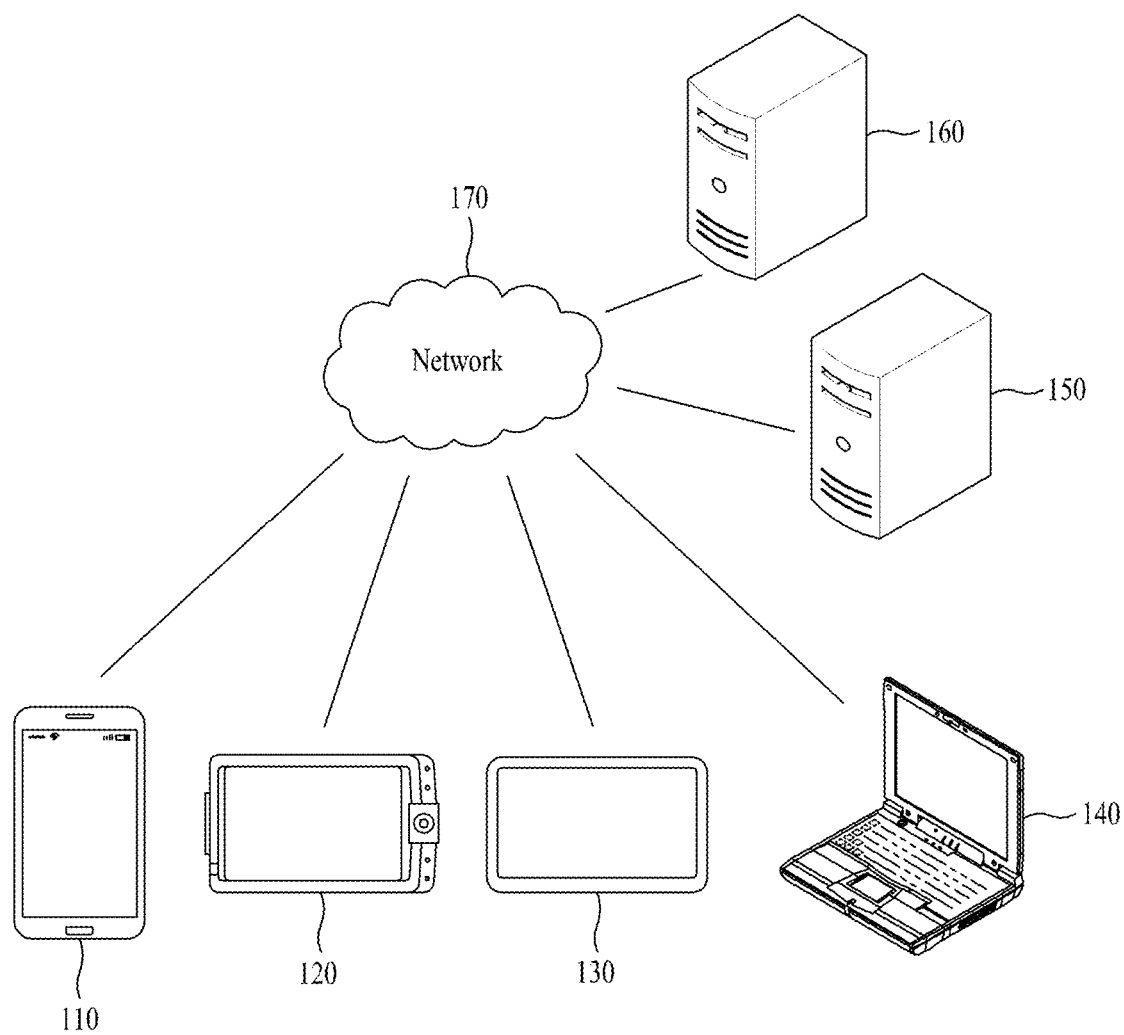
FIG. 1 is a diagram illustrating an example of a network environment according to at least one example embodiment.

At least one example embodiment will be described in detail with reference to the accompanying drawings. At least one example embodiment, however, may be embodied in various different forms, and should not be construed as being limited to only the illustrated examples. Rather, the illustrated examples are provided so that this disclosure will be thorough and complete, and will fully convey the concepts of this disclosure to those skilled in the art. Accordingly, known processes, elements, and techniques, may not be described with respect to at least one example embodiment. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as, or a similar meaning to, that commonly understood by one of ordinary skill in the art to which at least one example embodiment belongs. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned herein. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, at least one example embodiment may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of at least one example embodiment may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, at least one example embodiment will be described with reference to the accompanying drawings.

At least one example embodiment relates to technology for providing a call function based on a voice over Internet protocol (VoIP).

At least one example embodiment including the disclosures described herein may share a variety of media contents between call participants during a VoIP call using a social graph, and may display a reaction exchanged between the call participants during the VoIP call in real time, accordingly.

FIG. 1 illustrates an example of a network environment according to at least one example embodiment. Referring to FIG. 1, the network environment may include a plurality of electronic devices 110, 120, 130, and/or 140, a plurality of servers 150 and/or 160, and/or a network 170. FIG. 1 is provided as an example only. A number of electronic devices or a number of servers is not limited thereto.

Each of the plurality of electronic devices 110, 120, 130, and/or 140 may be a fixed terminal or a mobile terminal that is configured as a computer apparatus. For example, the plurality of electronic devices 110, 120, 130, and/or 140 may be a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, and/or the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and/or Internet. Also, the network 170 may include at least one of network topologies that include a bus network, a star network, a ring network, a mesh network, a star-bus network, a tree or hierarchical network, and/or the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and/or 140 over the network 170. For example, the server 150 may be a system that provides a first service to the plurality of electronic devices 110, 120, 130, and/or 140 connected over the network 170. The server 160 may be a system that provides a second service to the plurality of electronic devices 110, 120, 130, and/or 140 connected over the network 170. In detail, the server 150 may provide, as the first service, a service (e.g., a VoIP call service) intended (e.g., requested and/or received) by an application through the application as a computer program installed and executed on the plurality of electronic devices 110, 120, 130, and/or 140. As another example, the server 160 may provide, as the second service, a service that distributes a file for installing and executing the application to the plurality of electronic devices 110, 120, 130, and/or 140.

Figure 2:
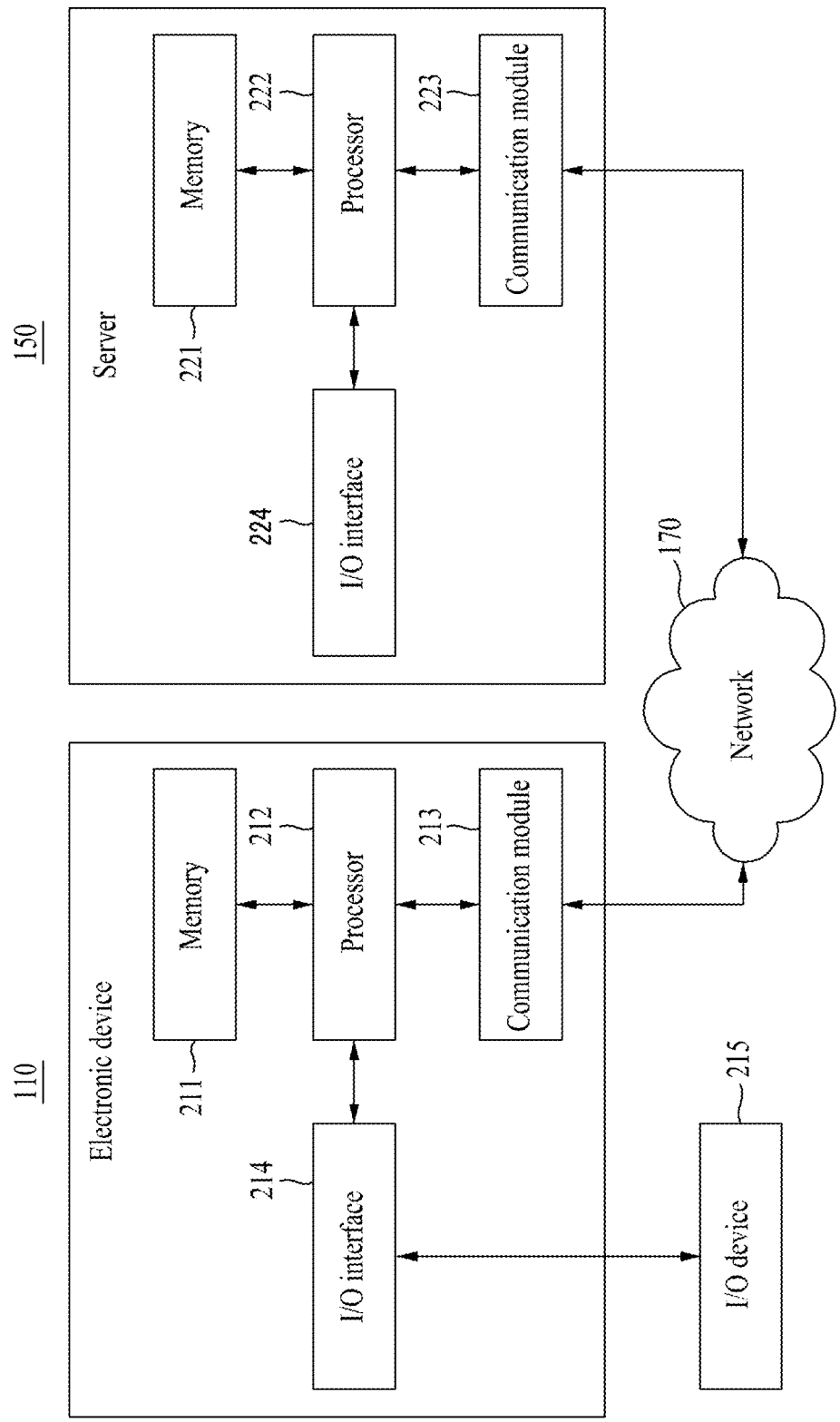
FIG. 2 is a diagram illustrating an example of an electronic device and a server according to at least one example embodiment.

FIG. 2 is a block diagram illustrating an example of an electronic device and a server according to at least one example embodiment. Description is made using the electronic device 110 as an example of an electronic device and the server 150 as an example of a server with reference to FIG. 2. Also, each of the other electronic devices 120, 130, and/or 140, and/or the server 160, may have the same configuration as, or a similar configuration to, that of the electronic device 110 or the server 150.

Referring to FIG. 2, the electronic device 110 may include a memory 211, a processor 212, a communication module 213, and/or an input/output (I/O) interface 214, and the server 150 may include a memory 221, a processor 222, a communication module 223, and/or an I/O interface 224. The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as a ROM, an SSD, a flash memory, and/or a disk drive, may be included in the electronic device 110 and/or the server 150 as a permanent storage device separate from the memory 211, 221. Also, an OS and at least one program code, for example, a code for a browser installed and executed on the electronic device 110, or an application installed and executed on the electronic device 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to at least one example embodiment, software components may be loaded to the memory 211, 221 through the communication module 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and/or I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170, and may provide a function for communication between the electronic device 110, and/or the server 150, and another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interfacing with an I/O apparatus 215 (e.g., an input device and/or an output device). The I/O apparatus 215 may also be referred to as an I/O device 215 herein. For example, an input device may include a device, such as a keyboard, a mouse, a microphone, a camera, etc., and an output device may include a device, such as a display, a speaker, a haptic feedback device, etc. As another example, the I/O interface 214 may be a device for interfacing with an apparatus in which an input function and an output function are integrated into a single function, such as a touchscreen. The I/O apparatus 215 may be configured as (e.g., incorporated in) a single device with the electronic device 110. Also, the I/O interface 224 of the server 150 may be a device for interfacing with an apparatus (not shown), for input or output, that may be connected to the server 150 or included in the server 150. In detail, when the processor 212 of the electronic device 110 processes an instruction of a computer program loaded to the memory 211, content or a service screen configured based on data provided from the server 150 or the electronic device 120 may be displayed on the display through the I/O interface 214.

According to at least one example embodiment, the electronic device 110 and/or the server 150 may include a number of components greater than or less than a number of components shown in FIG. 2. However, some components according to the related art are not illustrated in detail. For example, the electronic device 110 may include at least a portion of the I/O apparatus 215, or may further include other components, for example, a transceiver, a global positioning system (GPS) module, a camera, a variety of sensors, a database (DB), and/or the like. In detail, if the electronic device 110 is a smartphone, the electronic device 110 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, at least one example embodiment of a method and system for sharing contents during a VoIP-based call is described.

Figure 3:
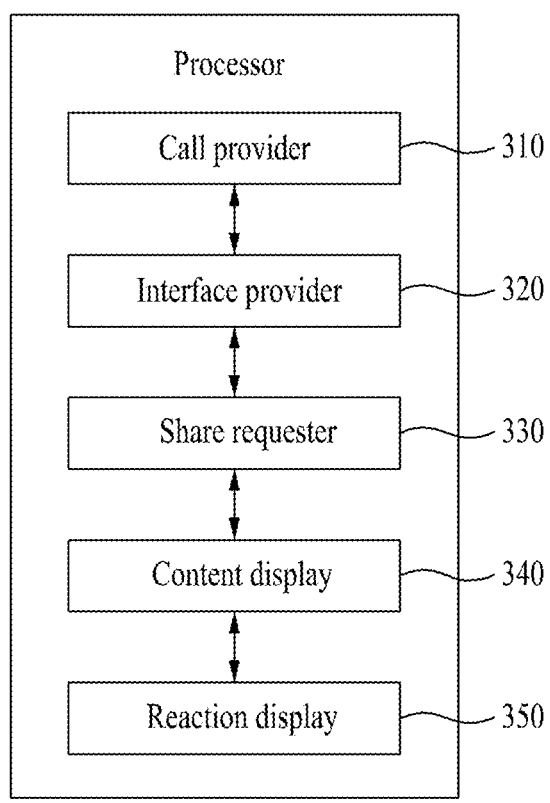
FIG. 3 is a diagram illustrating an example of components includable in a processor of an electronic device according to at least one example embodiment.
Figure 4:
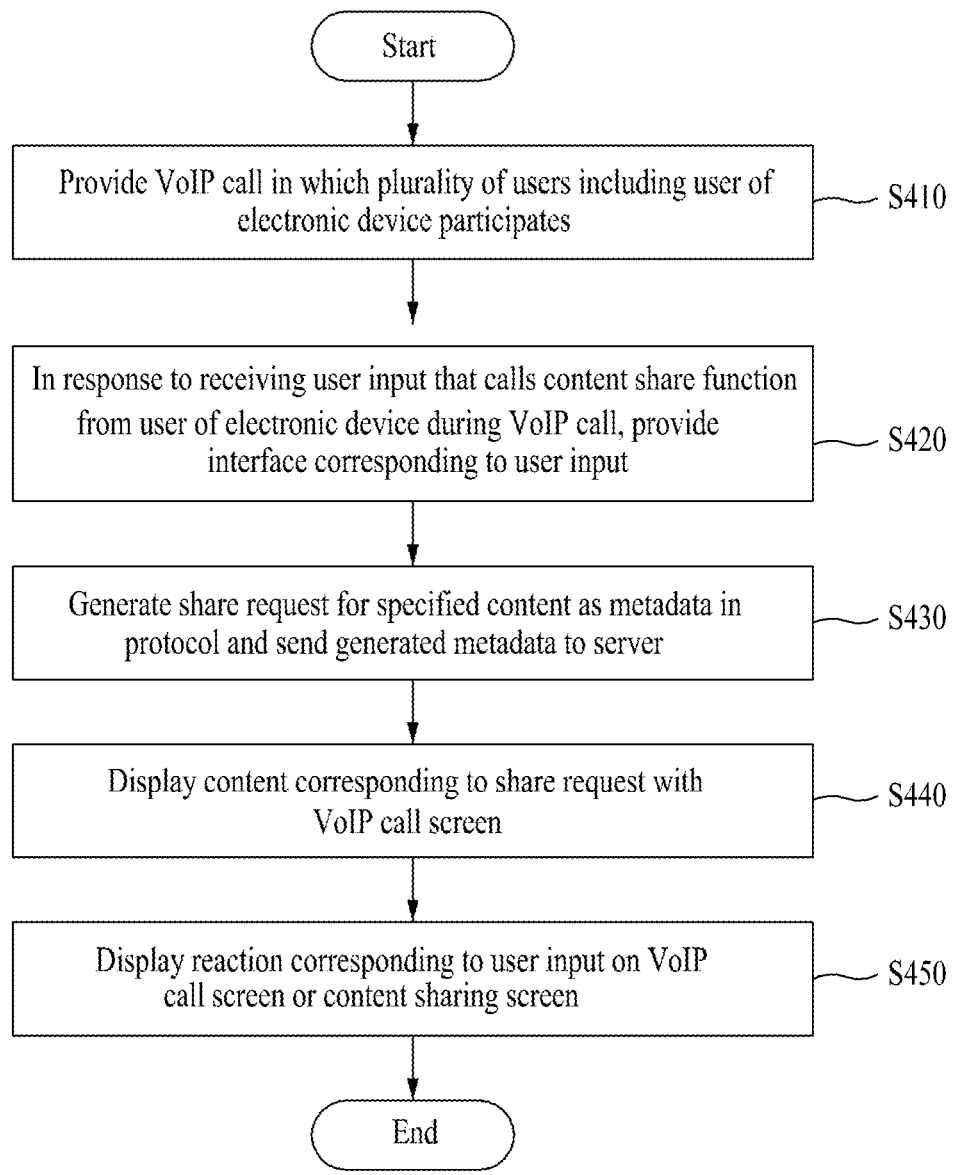
FIG. 4 is a flowchart illustrating an example of a method performed by an electronic device according to at least one example embodiment.

FIG. 3 is a diagram illustrating an example of components includable in a processor of an electronic device according to at least one example embodiment, and FIG. 4 is a flowchart illustrating an example of a method performed by an electronic device according to at least one example embodiment.

A VoIP call system implemented as a computer may be configured in the electronic device 110 according to at least one example embodiment. For example, the VoIP call system may be configured in a form of an independently operating program or may be configured in an in-app form of a specific application, for example, a messenger, to be operable on the specific application. Depending on at least one example embodiment, a VoIP call service may be provided through interaction with the server 150.

The VoIP call system configured in the electronic device 110 may perform the content sharing method of FIG. 4 in response to an instruction provided from an application installed on the electronic device 110.

Referring to FIG. 3, to perform the content sharing method of FIG. 4, the processor 212 of the electronic device 110 may include a call provider 310, an interface provider 320, a share requester 330, a content display 340, and/or a reaction display 350. Depending on at least one example embodiment, the components of the processor 212 may be selectively included in or excluded from the processor 212. Also, depending on at least one example embodiment, the components of the processor 212 may be separated or merged for representations of functions of the processor 212.

The processor 212, and/or the components of the processor 212, may control the electronic device 110 to perform operations S410 to S450 included in the content sharing method of FIG. 4. For example, the processor 212, and/or the components of the processor 212, may be configured to execute an instruction according to a code of at least one program and a code of an OS included in the memory 211.

Here, the components of the processor 212 may be representations of different functions of the processor 212 performed by the processor 212 in response to an instruction provided from the program code stored in the electronic device 110, for example, an instruction provided from the application executed on the electronic device 110. For example, the call provider 310 may be used as a functional representation of the processor 212 that controls the electronic device 110 to provide a VoIP call in response to the instruction.

The processor 212 may read an instruction from the memory 211 to which instructions associated with control of the electronic device 110 are loaded. In this case, the read instruction may include an instruction for controlling the processor 212 to perform the following operations S410 to S450.

Referring to FIG. 4, in operation S410, the call provider 310 may provide a VoIP call in which at least two users including a user of the electronic device 110 participate. The VoIP call may include a video call function and/or a voice call function based on VoIP. Here, the VoIP call may support a group call including a number of users less than a maximum, or upper limit, preset or alternatively, given number of users as well as a one-to-one call. For example, in response to a request for a VoIP call between users of the electronic device 110, 120, 130, and 140, it is possible to transfer a call request to an electronic device of a counterpart and thereby, to connect a VoIP-based call channel to users that accept to participate in a corresponding call. According to at least one example embodiment, each participant to the VoIP call (e.g., the electronic device 110, the electronic device 120, the electronic device 130, and/or the electronic device 140) may generate a picture and/or video by capturing an image (e.g., sensing light from the environment and generating a digital image based on the sensed light). The pictures and/or videos generated by each respective participant to the VoIP call (e.g., generated using a camera included in, for example, the electronic device 110) may be sent to the other participants of the VoIP call. The pictures and/or videos generated by each respective participant (e.g., other participants) to the VoIP call may be displayed in a call screen corresponding to the VoIP call.

In the case of a video call, the call provider 310 may transfer, to the server 150, an indication of an intent of the user of the electronic device 110 to participate in the call, may receive, from the server 150, videos of participants of the VoIP call as an individual video, may render the received participant videos into a single screen and may configure a video call screen. Instead of generating, on the side of the server 150, a single video that includes a plurality of participant videos and providing the generated single video to the electronic device 110, the server 150 may send each of the participant videos to the electronic device 110 as an individual video and the electronic device 110 may configure the plurality of participant videos into a video call screen on a single screen. According to at least one example embodiment, the plurality of participant videos may correspond to videos generated by each respective participant to the VoIP call.

In the case of a voice call, the call provider 310 may generate a list of participants based on profile information with respect to users that accept to participate in the call, and may configure a video and/or voice call screen that includes the list of participants. According to at least one example embodiment, the voice call screen may include pictures generated by each respective participant to the VoIP call.

In operation S420, in response to receiving a user input that calls a content share function, from the user of the electronic device 110 during the VoIP call, the interface provider 320 may provide (e.g., generate and/or output to a display of the electronic device 110) a graphical user interface (GUI) for specifying content desired to be shared with a participant in a call. The user input may include a media type selected as a content sharing medium. For example, the media type may include a screen share, and/or a content provider that provides a content sharing service such as YouTube, and the like. The content share function may be a function of sharing media content, through screen sharing or the content sharing service, between call participants during the VoIP call. The interface provider 320 may provide a GUI, corresponding to a media type by (e.g., included in) the user input, as an interface for specifying content to be shared with a call participant on a VoIP call screen.

For example, in the case of sharing content of the content provider as one of several media types, the interface provider 320 may provide a GUI for a content search. The interface provider 320 may provide a provider selection screen for selecting a content provider and, in response to a selection on (e.g., of) the content provider through the provider section screen, may provide a GUI capable of (e.g., configured to facilitate) searching for content in (e.g., on) a platform of the content provider. That is, the interface provider 320 may provide a list of content providers that provide the content sharing service and may provide an interface capable of searching (e.g., configured to facilitate a search) for content of a content provider selected from the list of content providers. The user may select a specific content provider as a media type and then may specify content that the user desires to share with a call participant through the content search within the platform of the corresponding content provider. According to at least one example embodiment, the interface provider 320 may provide a GUI for the content search that corresponds to the content provider selected via the provider selection screen. According to at least one example embodiment, the provider selection screen may include a list of available content providers and may be configured to receive a user input selecting one of the content providers from the list of available content providers.

As another example, in the case of sharing content through screen sharing as one of several media types, the interface provider 320 may provide a GUI that includes a preview for a screen sharing target. In the case of sharing content of a content provider through a URL, the interface provider 320 may provide a GUI that includes a preview for content of the corresponding URL. In the case of entering the VoIP call screen in a state in which a content URL of the content provider is copied on a clipboard, the interface provider 320 may recognize the entry as an instruction to call the content share function. Here, in response to recognizing the instruction to call the content share function, the interface provider 320 may provide a GUI that includes a preview for the URL copied to the clipboard. The user may verify a screen sharing target or media content of the URL through the preview, and then may specify the verified media content as content to be shared with the call participant.

In providing a GUI for a content search, the interface provider 320 may recommend a keyword for the content search based on profile information set to a chatroom (e.g., a chatroom corresponding to a VoIP call) or previously shared data in the corresponding chatroom during the VoIP call. Here, the profile information may include topic information of the chatroom. The interface provider 320 may recommend a keyword based on profile information of a user that participates in the chatroom, such as, for example, an age, a gender, and/or a residential area. In addition to the profile information, a matter (e.g., a topic) of interest may be derived by analyzing previous shared data, for example, messages or contents sent through the chatroom, and a keyword related to the derived matter of interest may be provided as a recommend keyword. For example, if at least a desired or alternatively, given ratio of messages for corona virus are present in the chatroom, the interface provider 320 may recommend a keyword related to corona virus. If statistical information, for example, recent news about the chatroom, is shared a large number of times, the interface provider 320 may recommend a keyword related to the corresponding news. Also, if a video of a LINE Friends channel is shared most based on a content sharing history of the chatroom, for example, using LINE LIVE during the VoIP call, the interface provider 320 may recommend a real-time popular keyword of LINE LIVE or a keyword related to the LINE Friends channel. In the case of an open chatroom in which a plurality of users gather and exchange content on a specific topic on a messenger platform, the interface provider 320 may recommend a keyword based on topic information set to the open chatroom.

In operation S430, in response to receiving a share request for specified content through the GUI from the user of the electronic device 110, the share requester 330 may generate the share request for the specified content as metadata in a protocol of the VoIP call channel, and may send the generated metadata to the server 150. That is, the share requester 330 may generate metadata of a VoIP call packet that includes data corresponding to the content share request and may send the generated metadata to the server 150.

A content sharing protocol for data exchange in a VoIP call state may be defined in advance based on a media type. For example, the content sharing protocol may include an identifier that represents a content share function and metadata defined based on a media type. Start and unset for content sharing may be processed through an event of a core. When the media type is a content provider, an identifier of the media type, an identifier, a title, a thumbnail, a playback state (playing, pause, etc.), and/or a playback position, of user specified content, and/or the like may be added to the metadata of the VoIP call packet. In the case of sharing content of the content provider through the URL, an identifier of the media type, a URL (e.g., a URL identifying the content and/or a location of the content), a playback state, and/or a playback position of the content may be added to the metadata of the VoIP call packet. When the media type is a screen share, an identifier of the media type, data used for screen sharing, and/or the like, may be added to the metadata of the VoIP call packet. The share requester 330 may describe all information used to synchronize content specified through the GUI (preview or search result) between the user of the electronic device 110 and the call participant as metadata of VoIP, and may send the same (e.g., the information) to the server 150.

In operation S440, the content display 340 may display content corresponding to the share request from the user of the electronic device 110 with the VoIP call screen. When the share request for the content specified through the GUI is transferred from the user of the electronic device 110 to the server 150, the content display 340 may display a playback screen (hereinafter, referred to as a "content sharing screen") of the corresponding content with the VoIP call screen. For example, the content display 340 may include the content sharing screen in the VoIP call screen through interaction with the call provider 310, and may adjust and display the playback screen as a single screen combined with the VoIP call screen. As another example, the content display 340 may display the content sharing screen to be overlaid on the VoIP call screen as an individual screen, such as picture-in-picture (PIP).

The server 150 may recognize a media type and content to be shared based on the metadata of the VoIP call packet, may determine the electronic device 110 that requests content share among call participants as a sender, and may determine at least one of the electronic devices 120, 130, and 140 of the remaining participants as a receiver.

The server 150 may transfer the metadata of the VoIP call packet that includes data corresponding to the content share request of the sender to at least one of the electronic devices 120, 130, and 140 corresponding to the receiver. The server 150 may perform relay functionality of transferring the metadata of the VoIP call packet between the sender and the receiver for sharing the content as is.

At least one of the electronic devices 120, 130, and 140 corresponding to the receiver may share the content in the same state as, or a similar state to, that of the sender based on the metadata of the VoIP call packet received from the sender through the server 150. When a video is to be shared, the sender may include only information about the video (e.g., URL information, or content identifier, and information about a start point in time) in the metadata, or may include the information in a video packet, and transfer the same to the receiver. The receiver may load the video from the content provider based on information included in the metadata or may start to play back the video included in the VoIP call packet received from the sender in a playback state of the sender as is without performing an additional loading operation. In the case of a request for sharing a playback list, the receiver may receive a state of the sender through the metadata of the VoIP call packet and may start to play back the video by directly referring to video information included in the playback list and filling the corresponding information.

For a VoIP call, a relay server, for example, the server 150 may be used to transfer the VoIP call packet. However, it is provided as an example only. Peer to peer (P2P) communication may be used without using the server 150. The electronic device 110 may directly transfer, to the electronic device 120 corresponding to the receiver, the metadata of the VoIP call packet that includes data corresponding to the content share request of the user through P2P of one-to-one communication. Therefore, the VoIP call packet may be sent and received between the sender and the receiver through P2P without using the server 150. Content may be shared during the VoIP call using the metadata of the VoIP call packet.

Basically, the sender may have a right (e.g., ability) to manipulate content shared with the receiver. When a user of a sender side modifies a playback position or a playback state, metadata of a VoIP call packet that includes modified data may be transferred to the receiver to synchronize a state of the content being shared between the sender and the receiver according to a manipulation of the sender. As another example, the receiver may receive a state of content being shared, or propose sharing of another content, based on consent from the sender or another call participant.

In operation S450, the reaction display 350 may display a reaction corresponding to the user input for the VoIP call screen, or the content sharing screen, on a corresponding screen in an environment of sharing content during the VoIP call. A method of displaying the reaction on the VoIP call screen or the content sharing screen is further described below.

FIGS. 5 to 8 illustrate examples of describing a process of sharing content during a VoIP call according to at least one example embodiment.

FIGS. 5 to 8 illustrate examples of an interface screen displayed on a display of the electronic device 110.

Figure 5:
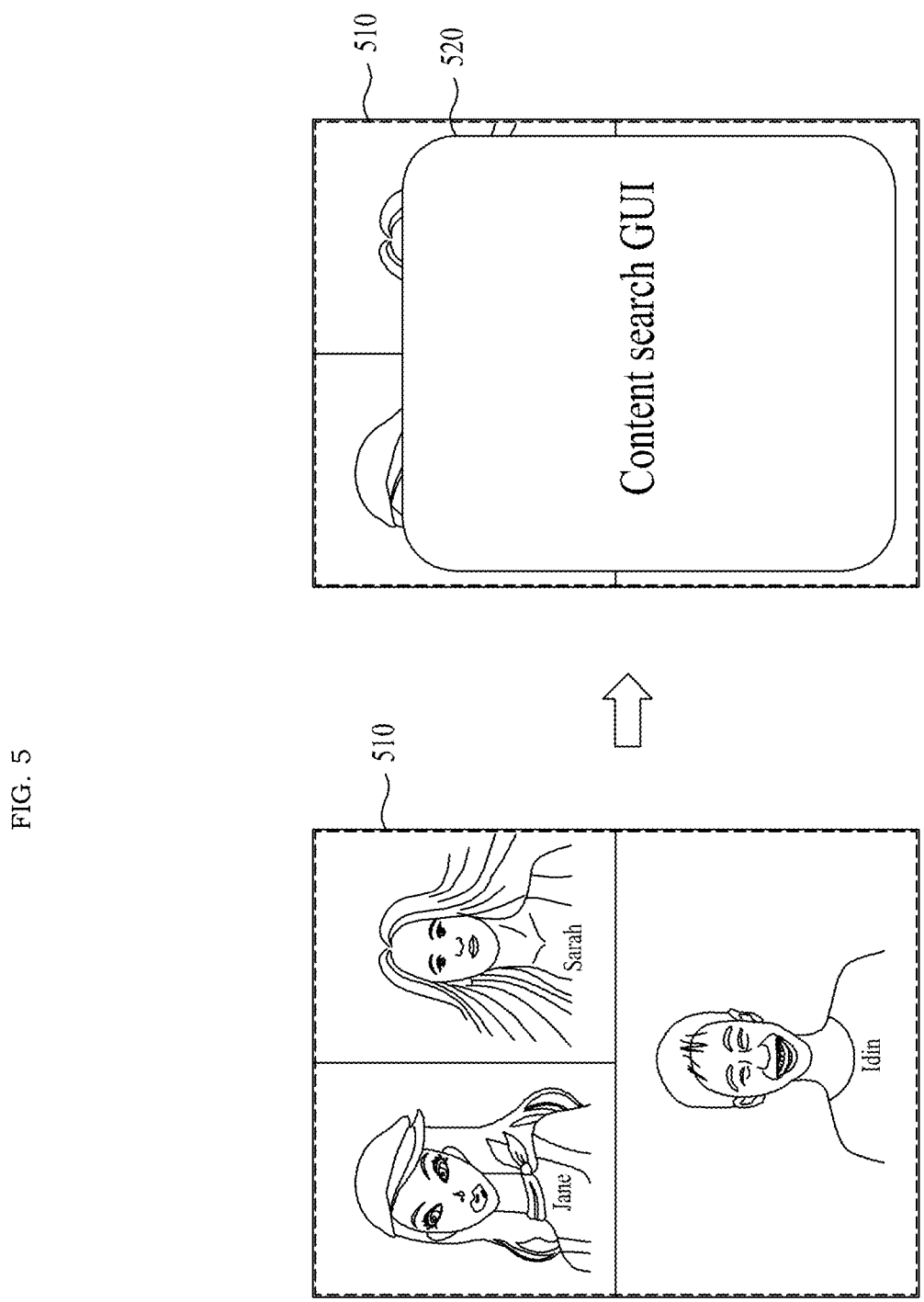
FIGS. 5 to 8 illustrate examples of a process of sharing content during a voice over Internet protocol (VoIP) call according to at least one example embodiment.

Referring to FIG. 5, the processor 212 may receive each of several participant videos of a VoIP call as an individual video, and may render the received participant videos into a single screen and then display a video call screen 510. In response to receiving a user input for calling a content share function from the user of the electronic device 110 during the VoIP call, the processor 212 may provide a GUI for specifying content desired to be shared with a participant in a call.

The video call screen 510 may be adjusted based on an environmental setting by the user and/or a number of participants. For example, the video call screen 510 may be configured such that all participant videos are displayed on a single screen, or participant videos are aligned in one direction and then swiped in an alignment direction. According to at least one example embodiment, participant videos up to a threshold number of videos may be displayed on the video call screen 710, and participant videos in excess of the threshold number may be displayed in response to a swipe gesture input.

Referring to FIG. 5, when the user desires to share content of a content provider, such as YouTube, as one of several media types, the processor 212 may provide a content search GUI 520 (e.g., as a pop-up screen, overlay, etc.). When a plurality of content providers is linkable, the processor 212 may provide a provider selection screen for selecting a content provider. In response to a selection on (e.g., of) a content provider through the provider selection screen, the processor 212 may provide the content search GUI 520 capable of searching (e.g., facilitating a search) for content in a platform of the selected content provider.

Figure 6:
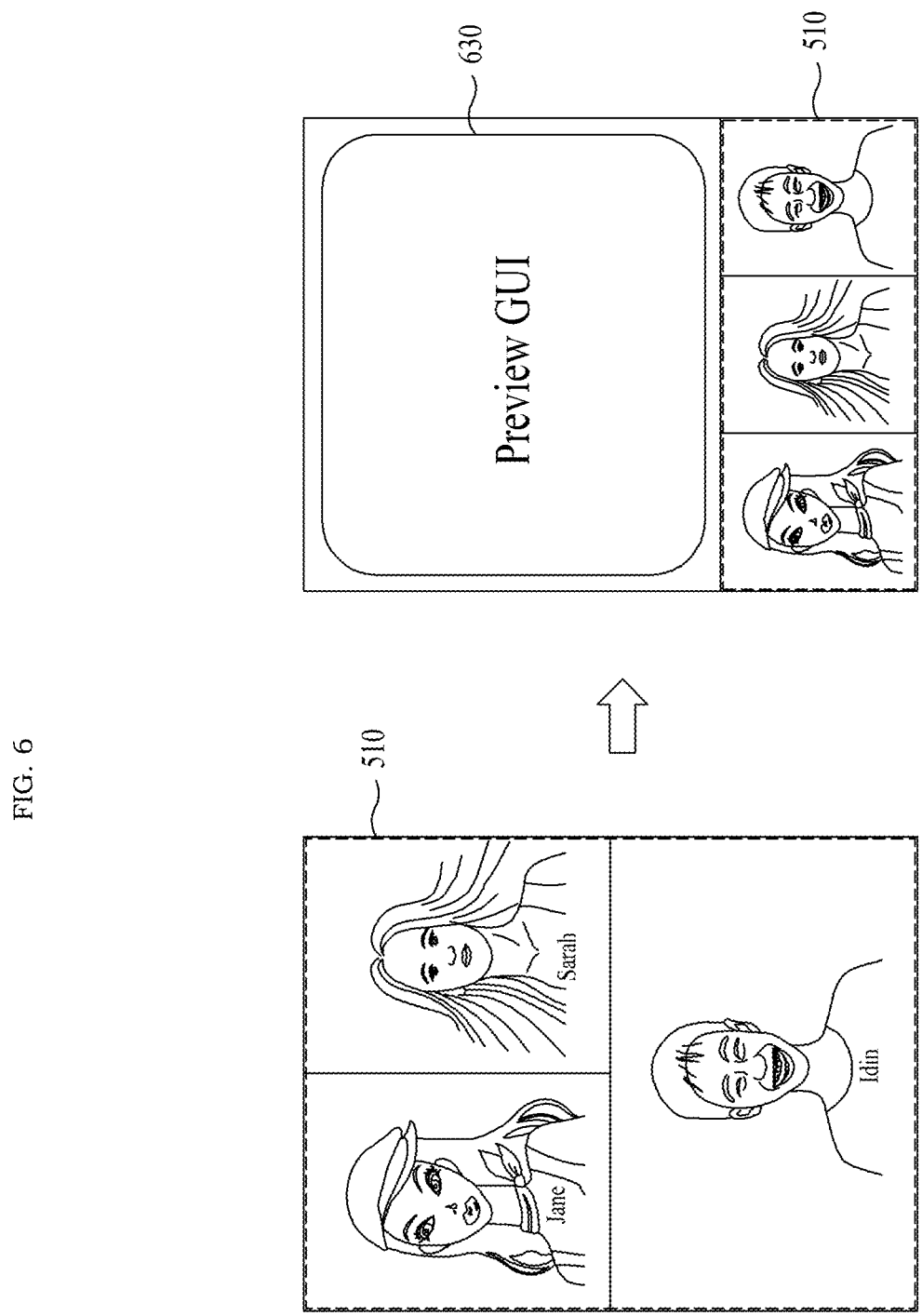

Referring to FIG. 6, when the user desires to share content through screen sharing as another media type, the processor 212 may provide a preview GUI 630 that includes a preview for a screen specified as a screen sharing target among screens executed on the electronic device 110.

The processor 212 may display the content search GUI 520 and/or the preview GUI 630 to be overlaid (e.g., as an overlay, pop-up, etc.) on the video call screen 510 as GUIs for specifying content (see FIG. 5), or may adjust the video call screen 510 and display the content search GUI 520 and the preview GUI 630 as a single screen combined with the video call screen 510 (see FIG. 6), as a GUI for specifying content.

Figure 7:
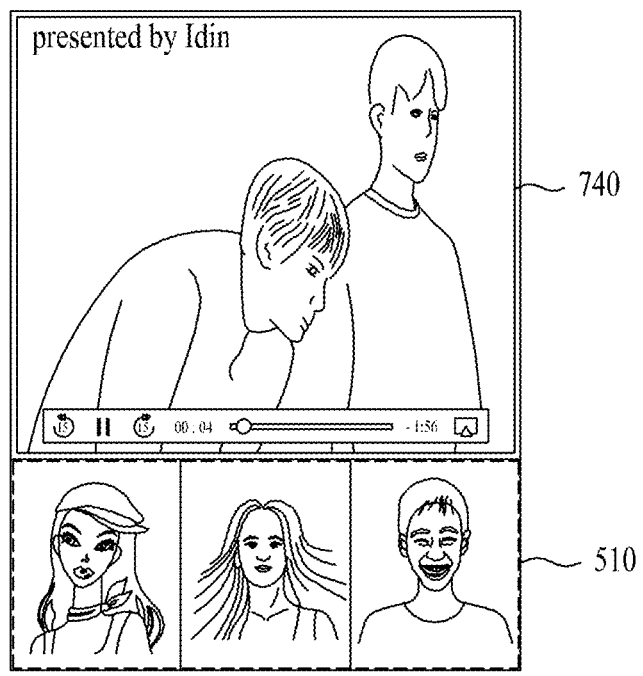

When the user specifies content through the content search GUI 520 or the preview GUI 630 and requests sharing of the specified content, the processor 212 may transfer, to a receiver, metadata of a VoIP call packet that includes data for the corresponding content sharing. Referring to FIG. 7, the processor 212 may display the video call screen 510 and a content sharing screen 740 that is a playback screen of content requested to be shared.

In the case of displaying the content sharing screen 740 on a single screen combined with the video call screen 510, the video call screen 510 may display participant videos on a remaining area excluding (e.g., outside of) the content sharing screen 740. Here, the video call screen 510 may be configured to display all of the participant videos or a portion of the participant videos. Alternatively, the video call screen 510 may be configured to align participant videos in one direction and to be swiped in an alignment direction. According to at least one example embodiment, participant videos up to a threshold number of videos may be displayed on the video call screen 710, and participant videos in excess of the threshold number may be displayed in response to a swipe gesture input.

Figure 8:
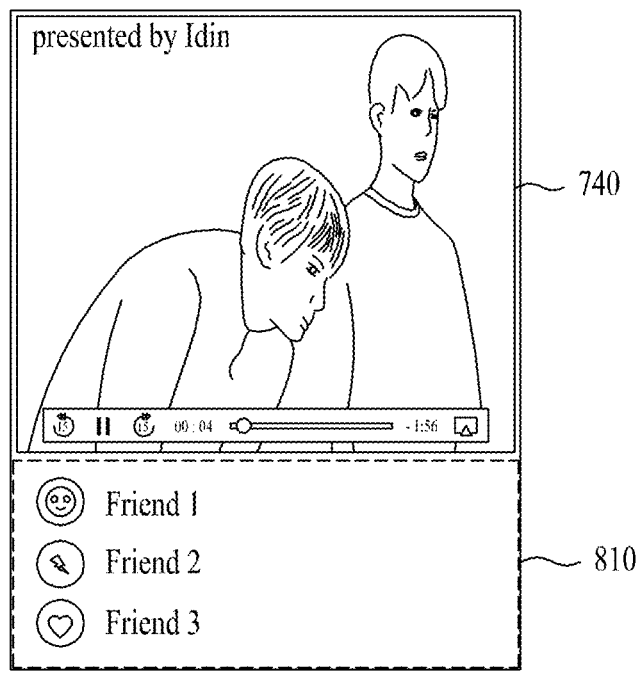

Referring to FIG. 8, in the case of a voice call in addition to a video call, the processor 212 may provide a voice call screen 810 that includes a list of participants participating in a call as a VoIP call screen. In the case of sharing content during the voice call, the processor 212 may display the content sharing screen 740 with the voice call screen 810 that includes the list of participants.

According to at least one example embodiment, a variety of media contents may be shared between call participants during a VoIP call, for example, a voice call or a video call, using a social graph.

Figure 9:
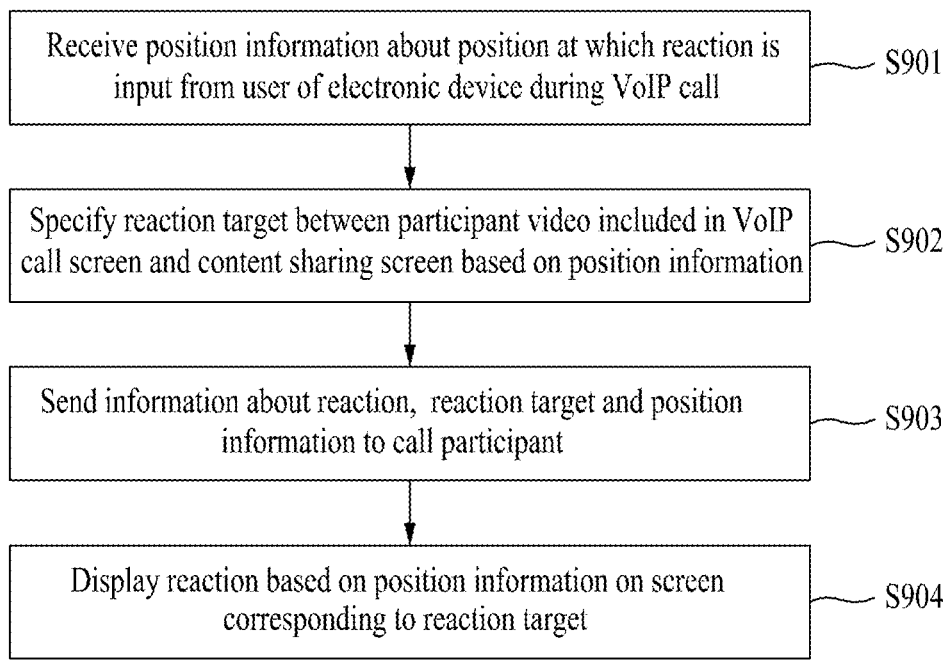
FIG. 9 is a flowchart illustrating an example of a method of displaying a reaction during a VoIP call according to at least one example embodiment.

FIG. 9 is a flowchart illustrating an example of a method of displaying a reaction during a VoIP call according to at least one example embodiment. The reaction display method of FIG. 9 may be performed by the reaction display 350 and may be included in operation S450 included in the content sharing method of FIG. 4.

Referring to FIG. 9, in operation S901, the reaction display 350 may receive position information about a position at which a reaction is input from the user of the electronic device 110 during the VoIP call, for example, the voice call or the video call. For example, the reaction display 350 may recognize coordinates of an actual position at which the reaction is input from the user using a touch, as position information on a screen, for example, the VoIP call screen or the content sharing screen, on which the reaction of the user is input. The coordinates of the position at which the reaction is input may include a single pair of XY coordinates based on a reaction type, and/or may include an XY coordinate set as trajectory information that tracks one or more touches. As another example, in the case of a reaction input on the content sharing screen, the reaction display 350 may recognize a playback position of content being played back on the content sharing screen at a point in time at which the reaction is input from the user as position information about the position at which the reaction of the user is input. According to at least one example embodiment, the reaction display 350 may receive and/or determine the position at which the reaction is input (e.g., a reaction position) and/or information about the reaction (e.g., reaction information). Information about the reaction may include a reaction type (e.g., like, dislike, etc.), and information about the reaction target may include information representing whether the corresponding reaction relates to a participant video in the VoIP call screen or the content sharing screen.

In operation S902, the reaction display 350 may specify a target (hereinafter, a reaction target) to which the reaction is input from the user of the electronic device 110 between (e.g., among) a participant video included in the VoIP call screen and the content sharing screen, based on the position information received in operation S901. The user may input the reaction to a single participant video, among participant videos included in the VoIP call screen, or the content sharing screen. Here, the reaction display 350 may specify the reaction target based on the position information about the position at which the reaction of the user is input. For example, the reaction display 350 may specify, as the reaction target, a screen corresponding to coordinates of an actual position at which the reaction is input between (e.g., among) the VoIP call screen and the content sharing screen. When the user inputs the reaction to a video of a specific participant on the VoIP call screen, the reaction display 350 may specify the reaction target through (e.g., using and/or as) an identifier of the corresponding specific participant. As another example, when a playback position of content is recognized as reaction position information, the reaction display 350 may specify the content sharing screen as the reaction target. As another example, the reaction display 350 may specify the reaction target by analyzing at least a portion of a screen corresponding to the playback position of the content. Here, the reaction display 350 may specify the reaction target by sending image data about at least a portion of the screen to the server 150, and by receiving, from the server 150, information about a thing, a person, and/or a location recognized from the image data using an image learning model constructed on the server 150 or a platform interactable with the server 150.

In operation S903, the reaction display 350 may send information about the reaction input from the user of the electronic device 110, and the reaction target and position information related to the corresponding reaction, to another user participating in the VoIP call, that is, a call participant. Information about the reaction may include a reaction type, and information about the reaction target may include information representing whether the corresponding reaction relates to a participant video in the VoIP call screen or the content sharing screen. The reaction display 350 may generate information about the reaction and the reaction target, and the reaction position information, as metadata in a protocol of the VoIP call channel, and may send the generated metadata to the call participant through the server 150 or peer-to-peer (P2P) communication. For example, the reaction display 350 may send metadata of a VoIP call packet including information about the reaction, the reaction target and the reaction position information to all of users participating in the VoIP call. According to at least one example embodiment, the sending of the metadata to another user participating in the VoIP call causes an indication of the reaction to be displayed on a screen of a computer apparatus of the other user (e.g., based on the metadata). As another example, the reaction display 350 may specify a participant corresponding to the reaction target among users that participate in the VoIP call and may send, to the specified participant, metadata of the VoIP call packet that includes information about the reaction and the reaction position information.

In operation S904, the reaction display 350 may display the reaction (e.g., an indication of the reaction) at a corresponding position (also referred to herein as a corresponding location) based on the reaction position information on a screen corresponding to the reaction target between the VoIP call screen and the content sharing screen. An object matched to a corresponding reaction may be predefined or alternatively, given for each reaction. The reaction display 350 may display an object matched to the reaction input from the user at the position at which the reaction is input, in association with the reaction target. Here, the object may include a visual element, such as an image, an effect animation, and/or the like, predefined or alternatively, given to correspond to the reaction. In addition to the visual element, the object may further include a tactile element, such as a haptic element, and/or an audio-based auditory element.

All of the electronic devices 120, 130, and 140 of other users participating in the VoIP call may display the content sharing screen with the VoIP call screen. Here, the reaction input from the user of the electronic device 110, the reaction target, and the reaction position information may be analyzed based on the metadata of the VoIP call packet received from the electronic device 110. The electronic device 120, 130, 140 of the other users may display the reaction input from the user of the electronic device 110 at the corresponding position based on the reaction position information on a screen corresponding to the reaction target between the VoIP call screen and the content sharing screen. Depending on at least one example embodiment, only an electronic device, for example, the electronic device 120, of a participant corresponding to the reaction target among the electronic devices 120, 130, and 140 of the other users that participate in the VoIP call, may receive reaction-related metadata from the electronic device 110 and may display the reaction input from the user of the electronic device 110 on a participant video screen of the user of the electronic device 110 within the VoIP call screen.

Figure 10:
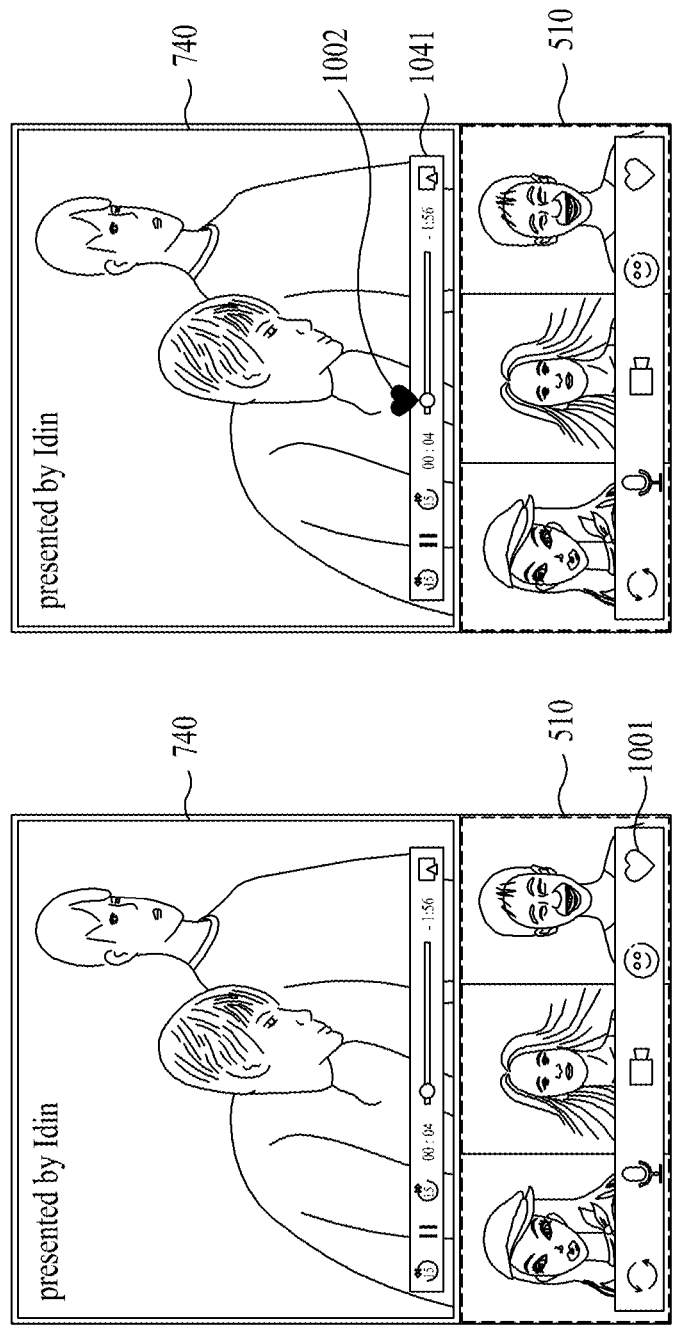
Figure 12:
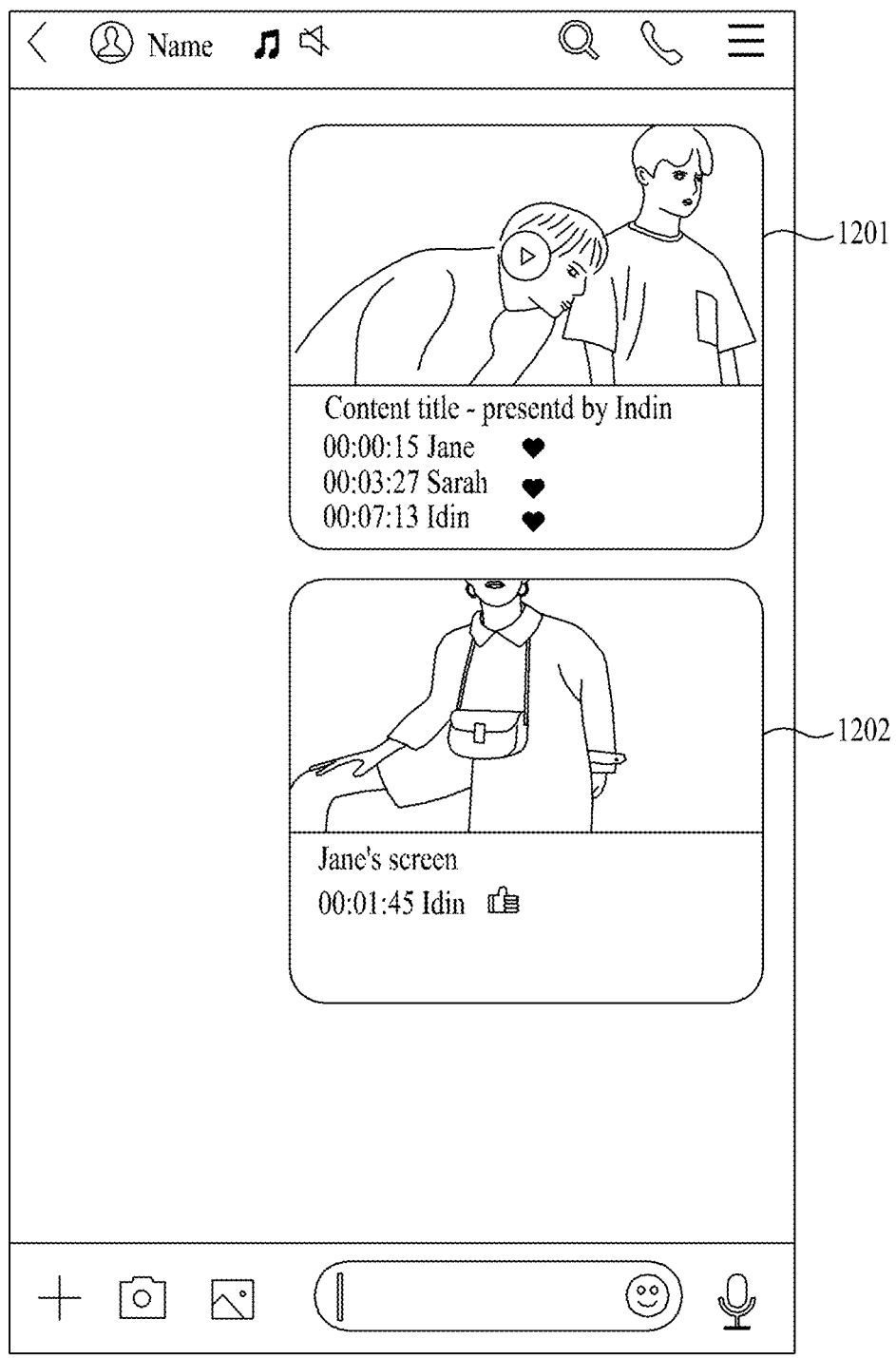

FIGS. 10 to 12 illustrate examples of a process of displaying a reaction during a VoIP call according to at least one example embodiment.

FIGS. 10 and 11 illustrate examples of a scenario in which a reaction is transferred between users during a video call.

Referring to FIG. 10, the user of the electronic device 110 may share the same video, or similar videos, with other users participating in the video call through the content sharing screen 740. Here, the user may input a reaction at a specific playback position while viewing the video.

When the reaction is input through a reaction input interface 1001, for example, a like button, associated with the content sharing screen 740, the processor 212 may recognize a playback position of content, at a point in time at which the reaction is input from the user, as position information about the position at which the reaction of the user is input.

The processor 212 may display an image 1002 of the reaction input from the user on the content sharing screen 740, for example, a progress bar 1041 that represents the playback position of content. Here, the image 1002 of the reaction may be displayed at a point corresponding to the playback position at the point in time at which the reaction is input from the user.

All of the electronic devices 120, 130, and 140 of the other users participating in the VoIP call may display the reaction input (e.g., the image 1002 of the reaction input) from the user of the electronic device 110 at an input position of the reaction on the content sharing screen 740 being shared with the user of the electronic device 110, and may share the position at which the reaction is input among the users that participate in the VoIP call.

Referring to FIG. 11, the user of the electronic device 110 may share a shopping site screen 1150, specified as a screen sharing target among screens executed on the electronic device 110, as a content sharing screen with other users that participate in the video call, and may input a reaction to a specific item on the shopping site screen 1150 through screen share.

The processor 212 may display a reaction input interface 1101 in response to a user input on the shopping site screen 1150 corresponding to the content sharing screen. Here, the user may input the reaction at a position of the specific item on the shopping site screen 1150 through the reaction input interface 1101.

The processor 212 may display an image 1102 of the reaction input from the user at the position at which the reaction is input from the user on the shopping site screen 1150.

All of the electronic devices 120, 130, and 140 of the other users participating in the VoIP call may display the reaction input from the user of the electronic device 110 on the shopping site screen 1150 that is shared with the user of the electronic device 110 and, through this, may share the position at which the reaction is input among the users participating in the VoIP call.

The processor 212 may identify a user that inputs a reaction among VoIP call participants and may display the reaction image 1102 on a video screen of the corresponding user in the video call screen 510. Through this, the processor 212 may easily verify the user corresponding to the reaction among users that participate in the VoIP call.

In addition to the above scenario, while sharing a screen on which a collaboration document is displayed between users participating in the VoIP call in a similar manner to the scenario described above with reference to FIG. 11, a collaboration using screen share may forward, as a reaction, a question or an opinion on a specific portion in a document on the screen.

In addition to the reaction to content being shared during the VoIP call, it is possible to designate and transfer a specific participant on the video call screen 510. When the user of the electronic device 110 selects a specific participant and inputs a reaction on the video call screen 510, the processor 212 may display a reaction image on a corresponding participant video screen in the video call screen 510.

During the VoIP call, the reaction may be unilaterally received and displayed, and may also be bidirectionally exchanged and displayed. For example, a reaction in which, if a user 1 participating in the VoIP call draws and delivers a part of a heart, a user 2 draws and completes the rest may be applied.

Also, the processor 212 may send information about media content being shared during the VoIP call, and information about a reaction received during the VoIP call, to a chatroom in which the corresponding VoIP call is ongoing and, in this manner, may manage the information.

Referring to FIG. 12, when users participating in the VoIP call similar to the scenario of FIG. 10 input reactions for a video being shared during the VoIP call, the processor 212 may receive a thumbnail of the corresponding video, a reaction object, a time at which the reaction is input, and/or a user nickname, and may record and display the same as a message type 1201 included in a chatroom 1200. According to at least one example embodiment, the processor 212 may manage the information about the media content being shared during the VoIP call, and the information about the reaction received during the VoIP call, by transforming the information to, and/or recording the information as, a message (e.g., in a message format) consistent with the message type 1201 used in the chatroom 1200.

Also, similar to the scenario of FIG. 11, when users participating in the VoIP call input reactions for a screen being shared during the VoIP call, the processor 212 may receive a capture image of the sharing screen, a reaction object, a time at which the reaction is input, and/or a user nickname, and may record and display the same as a message type 1202 included in the chatroom 1200. Here, if a user participating in the VoIP call inputs a reaction for another user during the VoIP call, the processor 212 may display an image of the user that is a target of the reaction and a reaction object of the user having input the reaction.

Therefore, the processor 212 may build a history related to the VoIP call by managing information about media content and reactions exchanged during the VoIP call through the chatroom 1200. That is, although the VoIP call is terminated, data about the media content and the reactions exchanged during the VoIP call may be preserved in the chatroom 1200.

As described above, according to at least one example embodiment, a reaction exchanged between call participants during a VoIP call may be displayed in real time.

According to at least one example embodiment, operations described herein as being performed by the electronic device 110, the electronic device 120, the electronic device 130, the electronic device 140, the server 150, the server 160, the processor 212, the processor 222, the call provider 310, the interface provider 320, the share requester 330, the content display 340 and/or the reaction display 350 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The above-described methods according to at least one example embodiment may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

While this disclosure includes at least one example embodiment, it will be apparent to one of ordinary skill in the art that various alterations and modifications in form and details may be made without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A reaction display method performed by a computer apparatus including processing circuitry, the reaction display method comprising:
   displaying, by the processing circuitry, a content sharing screen with a voice over Internet protocol (VoIP) call screen during a VoIP call, the content sharing screen including shared media content, and a user of the computer apparatus participating in the VoIP call;
   receiving, by the processing circuitry, a position at which a reaction is input from the user during the VoIP call;
   sending reaction information and the position to at least one other user participating in the VoIP call, the reaction information corresponding to the reaction;
   displaying an indication of the reaction on the VoIP call screen or the content sharing screen based on the position;
   in response to the reaction being input from the user during the VoIP call, automatically generating a first chatroom message including information about the shared media content and the reaction information;
   sending, by the processing circuitry, the first chatroom message to a chatroom related to the VoIP call, the chatroom being provided on a messenger service; and
   displaying a plurality of chatroom messages in the chatroom, the first chatroom message being among the plurality of chatroom messages.

2. The reaction display method of claim 1, wherein the receiving comprises recognizing coordinates on the VoIP call screen or the content sharing screen at which the reaction is input as the position.

3. The reaction display method of claim 1, wherein the receiving comprises recognizing a playback position of content being played back on the content sharing screen at a point in time at which the reaction is input as the position.

4. The reaction display method of claim 1, further comprising:
   specifying, by the processing circuitry, a reaction target among a participant video in the VoIP call screen and the content sharing screen based on the position.

5. The reaction display method of claim 4, wherein the specifying comprises specifying a screen corresponding to coordinates of the position among the VoIP call screen and the content sharing screen as the reaction target.

6. The reaction display method of claim 4, wherein the specifying comprises specifying the content sharing screen as the reaction target in response to a playback position of content being played back on the content sharing screen being received as the position.

7. The reaction display method of claim 4, wherein the sending the reaction information and the position comprises:
   specifying a particular user corresponding to the reaction target among a plurality of other users participating in the VoIP call; and
   sending the reaction information and the position to the particular user.

8. The reaction display method of claim 1, wherein the sending the reaction information and the position comprises:
   generating metadata of a VoIP call packet including the reaction information and the position; and
   sending the metadata to the at least one other user, wherein the sending the metadata causes the indication of the reaction to be displayed on a screen of a computer apparatus of the at least one other user based on the metadata.

9. The reaction display method of claim 1, wherein the displaying comprises displaying an object matched to the reaction at a location on one of the VoIP call screen or the content sharing screen based on the position.

10. The reaction display method of claim 1, further comprising:
  managing, by the processing circuitry, the information about the shared media content and the reaction information as the first chatroom message received in the chatroom,
  wherein the first chatroom message includes a captured image of the shared media content as the information about the shared media content.

11. A non-transitory computer-readable record medium storing instructions that, when executed by at least one processor, cause the at least one processor to implement the reaction display method of claim 1.

12. The reaction display method of claim 1, wherein the displaying comprises displaying an object matched to the reaction at a first location on the content sharing screen and a second location on the VoIP call screen, the first location being based on the position, and the second location corresponding to the user.

13. The reaction display method of claim 1, wherein
  the user is a first user; and
  the first chatroom message includes an image of a second user, the at least one other user including the second user.

14. The reaction display method of claim 13, wherein the displaying the plurality of chatroom messages comprises:
  displaying the image of the second user above the reaction information in the first chatroom message.

15. A computer apparatus comprising:
  processing circuitry is configured to,
    display a content sharing screen with a voice over Internet protocol (VoIP) call screen during a VoIP call, the content sharing screen including shared media content, and a user of the computer apparatus participating in the VoIP call,
    receive a position at which a reaction is input from the user during the VoIP call,
    send reaction information and the position to at least one other user participating in the VoIP call, the reaction information corresponding to the reaction,
    display an indication of the reaction on the VoIP call screen or the content sharing screen based on the position,
    in response to the reaction being input from the user during the VoIP call, automatically generate a first chatroom message including information about the shared media content and the reaction information,
    send the first chatroom message to a chatroom related to the VoIP call, the chatroom being provided on a messenger service, and
    display a plurality of chatroom messages in the chatroom, the first chatroom message being among the plurality of chatroom messages.

16. The computer apparatus of claim 15, wherein the processing circuitry is configured to recognize coordinates on the VoIP call screen or the content sharing screen at which the reaction is input as the position.

17. The computer apparatus of claim 15, wherein the processing circuitry is configured to recognize a playback position of content being played back on the content sharing screen at a point in time at which the reaction is input as the position.

18. The computer apparatus of claim 15, wherein the processing circuitry is configured to specify a reaction target among a participant video in the VoIP call screen and the content sharing screen based on the position.

19. The computer apparatus of claim 18, wherein the processing circuitry is configured to:
  specify a particular user corresponding to the reaction target among a plurality of other users participating in the VoIP call; and
  send the reaction information and the position to the particular user.

20. The computer apparatus of claim 15, wherein the processing circuitry is configured to:
  generate metadata of a VoIP call packet including the reaction information and the position; and
  send the metadata to the at least one other user,
  wherein the processing circuitry is configured to cause the indication of the reaction to be displayed on a screen of a computer apparatus of the at least one other user based on the metadata by sending the metadata to the at least one other user.

21. The computer apparatus of claim 15, wherein the processing circuitry is configured to display an object matched to the reaction at a location on one of the VoIP call screen or the content sharing screen based on the position.

22. The computer apparatus of claim 15, wherein the processing circuitry is configured to:
  manage the information about the shared media content and the reaction information as the first chatroom message received in the chatroom,
  wherein the first chatroom message includes a captured image of the shared media content as the information about the shared media content.

* * * * *